(12) United States Patent
Hamer et al.

(10) Patent No.: US 6,703,200 B1
(45) Date of Patent: Mar. 9, 2004

(54) METHODS AND MATERIALS FOR THE RAPID AND HIGH VOLUME PRODUCTION OF A GENE KNOCK-OUT LIBRARY IN AN ORGANISM

(75) Inventors: John E. Hamer, Durham, NC (US); Lisbeth Hamer, Durham, NC (US)

(73) Assignee: Paradigm Genetics, Inc., Research Triangle Park, NC (US)

(*) Notice: Subject to any disclaimer, the term of this patent is extended or adjusted under 35 U.S.C. 154(b) by 0 days.

(21) Appl. No.: 09/658,859

(22) Filed: Sep. 11, 2000

Related U.S. Application Data

(63) Continuation-in-part of application No. 09/270,670, filed on Mar. 17, 1999.

(51) Int. Cl.[7] ............................................ C12Q 1/68
(52) U.S. Cl. ............................................ 435/6; 435/484
(58) Field of Search ........................ 435/6, 447, 254.1, 435/484; 536/23.1

(56) References Cited

U.S. PATENT DOCUMENTS

| | | | |
|---|---|---|---|
| 5,102,797 A | | 4/1992 | Tucker et al. |
| 5,677,170 A | | 10/1997 | Devine et al. |
| 5,728,551 A | | 3/1998 | Devine et al. |
| 5,876,931 A | | 3/1999 | Holden |
| 6,090,581 A | * | 7/2000 | Gavrias .................. 435/69.1 |
| 6,156,574 A | * | 12/2000 | Heintz et al. ............. 435/466 |
| 6,207,384 B1 | * | 3/2001 | Mekalanos et al. ............ 435/6 |
| 6,326,204 B1 | * | 12/2001 | DelCardayre et al. ...... 435/440 |
| 6,500,636 B1 | * | 12/2002 | Hecht et al. .............. 435/69.1 |

FOREIGN PATENT DOCUMENTS

| | | |
|---|---|---|
| WO | WO97/29202 | 8/1997 |
| WO | WO98/10077 | 3/1998 |
| WO | WO98/20161 | 5/1998 |
| WO | WO98/37205 | 8/1998 |
| WO | WO98/40510 | 9/1998 |
| WO | WO98/50080 | 11/1998 |
| WO | WO98/50539 | 11/1998 |
| WO | WO98/56903 | 12/1998 |
| WO | WO99/07871 | 2/1999 |
| WO | WO99/09817 | 3/1999 |

OTHER PUBLICATIONS

Migheli et al. Transposition of the autonomous Fot1 element in the filamentous fungus *Fusarium oxysporum*. Genetics vol. 151:1005–1013, Mar. 1999.*

Adachi, K. et al, "Divergent cAMP Signaling Pathways Regulate Growth and Pathogenesis in the Rice Blast Fungus *Magnaporthe grisea*," The Plant Cell, The American Society of Plant Physiologists (US), p. 1361–1373, (Aug., 1998).

Carroll, A, et al., "Improved Vectors for Selecting Resistance to Hygromycin," The University of Kansas Medical Center (Kansas), p. 1, (Oct. 27, 1998).

Devine, S. et al., "A Transposon –Based Strategy for Sequencing Repetitive DNA in Eukaryotic Genomes," Genome Research, Cold Spring Harbor Laboratory Press, p. 551–563, (1997).

De Groot M. et al., "Nature Biotechnology ,"*Agrobacterium Tumefaciens*–Mediated Transformation of Filamentous Fungi, p. 839–842, ( Apr. 27, 1998).

Epicentre Technologies, "EZ::TN Insertion System," Product Index, Epicentre Technologies, p. 1–5, ( Mar. 30, 1998).

Lampe, David et al., "Factors Affecting Transposition of the Himar1 Mariner Transposon in Vitro," Genetics, Genetics Society of America (US), p. 179–187, (1998).

Lampe, David et. al, "A purified mariner transposase is sufficient to mediate transposition in vitro," The EMBO Journal, Oxford University Press, p. 5470–5479, (1996).

New England Biolabs, Inc., "GPS–1 Genome Priming System," Technical Bulletin #7100, New England Biolabs, Inc. (Beverly, MA), p. 1–2, (Oct. 30, 1998).

Nishimura, Marie et al., "Construction of a BAC Library of the RIce Blast Fungus *Magnaporthe grisea* and Finding Specific Genome Regions in which its Transposons Tend to Cluster," Biosci. Biotechnol.Biochem., p. 1515–1521, (1998).

(List continued on next page.)

*Primary Examiner*—James Ketter
(74) *Attorney, Agent, or Firm*—Laura L. Kiefer; Timothy G. Hofmeyer; Deborah H. Spencer

(57) ABSTRACT

The present invention relates to a method for facilitating site directed homologous recombination in an organism to produce mutants comprising:

1) providing a large insert vector library comprising one or more large insert vectors, each of said large insert vectors comprising a piece of DNA, said DNA piece comprising multiple genes from a target organism and a first selectable marker functional for selection in bacteria;

2) providing a second vector comprising a transposable element, said transposable element comprising a nucleotide sequence coding for a second selectable marker flanked on each side by an inverted repeat sequence, wherein said selectable marker is bifunctional for selection in bacteria and the target organism and wherein said inverted repeat sequences are functional as a binding site for a transposase;

3) incubating said library with said second vector in the presence of a transposase specific for the inverted repeat sequences on the plasmid vector, such that the transposable element is transferred randomly into an individual large insert of the large insert library to produce disrupted large insert vectors;

4) optionally, amplifying the disrupted large insert vectors resulting from step 3);

5) introducing at least one of said disrupted large insert vectors into a target host cell; and 6) selecting for successful homologous recombination in said target host cell using the second selectable marker.

11 Claims, 1 Drawing Sheet

OTHER PUBLICATIONS

PE Applied Biosystems, "Primer Island Transportation Kit," PE Applied Biosystems: Protocol, The Perkin –Elmer Corporation (California), p. i28, (Jul. 7, 1997).

Robertson, H. et al., "Annu. Rev. Entomol," Distribution of Transposable Elements in Arthropods, Annual Reviews Inc., p. 333–357, (Apr. 26, 1995).

Rubin, Eric et. al., "In Vivo transposition of mariner–based elements in enteric bacteria and mycobacteria," Microbiology, Proc. Natl. Acad. Sci. (US), vol. 96, p. 1645–1650, (Feb. 1999).

Westphal, C.H. et al., "Transposon–generated 'knock–out' and 'knock–in' gene –targeting constructs for use in mice," Current Biology, Current Biology, Ltd., p. 530–533, (1997).

Zhang, L. et al., "The Himar1 mariner transposase cloned in a recombinant adenovirus vector is functional in mammalian cells," Nucleic Acids Research, Oxford University Press, p. 3687–3693, (1998).

Stratagene Catalog, p. 39 (Jun. 1998).

An et al., "New cosmid vectors for library construction, chromosome walking and restriction mapping in filamentous fungi," Gene, Elsevier Science B.V., vol. 176, p. 93–96, (Nov. 1996).

De Mendoza et al., "In vivo cloning of DNA into multicopy cosmids by mini–Mu–cosduction," Mol Gen Genet, vol. 205, p. 546–549 (Mar., 1986).

De Marsac et al., "A new approach for molecular cloning in Cyanobacteria: cloning of an *Anacystis nidulans* met gene using a Tn 901–induced mutant," Gene, Elsevier Biomedical Press, vol. 20, p. 111–119 (Nov. 1989).

\* cited by examiner

SEQUENCE LISTING

<160> NUMBER OF SEQ ID NOS: 3

<210> SEQ ID NO 1
<211> LENGTH: 21
<212> TYPE: DNA
<213> ORGANISM: Artificial Sequence
<220> FEATURE:
<223> OTHER INFORMATION: Primer for sequencing -continued

```
<400> SEQUENCE: 1
tcgctcttga agggaactat g                                              21

<210> SEQ ID NO 2
<211> LENGTH: 17
<212> TYPE: DNA
<213> ORGANISM: Artificial Sequence
<220> FEATURE:
<223> OTHER INFORMATION: Primer for PCR

<400> SEQUENCE: 2
ggcgttgtga tctgcag                                                   17

<210> SEQ ID NO 3
<211> LENGTH: 17
<212> TYPE: DNA
<213> ORGANISM: Artificial Sequence
<220> FEATURE:
<223> OTHER INFORMATION: Primer for PCR

<400> SEQUENCE: 3
ggccaggaaa ctcccag                                                   17
```

METHODS AND MATERIALS FOR THE RAPID AND HIGH VOLUME PRODUCTION OF A GENE KNOCK-OUT LIBRARY IN AN ORGANISM

CROSS-REFERENCES TO RELATED INVENTIONS

This application is a continuation-in-part of now abandoned U.S. patent application Ser. No. 09/270,620, filed on Mar. 17, 1999, the contents of which is incorporated by reference.

BACKGROUND

The present invention relates to methods and materials for the systematic and random insertion of genetic material into the genome of an organism. The invention allows the rapid mutagenesis of organisms to mutate essentially every gene of an organism, particularly fungi, and allow the reliable and efficient identification of the gene being knocked out in each mutagenesis event. The invention also facilitates very high efficiency of homologous recombination, particularly in species, such as filamentous fungi, that have previously been notorious for low frequency of such events.

Numerous methods for introducing foreign genetic material into living cells have become routine since the first instances of genetic engineering almost a quarter century ago. Introduction of foreign genetic material can be into the cell via a vector that may replicate or by incorporation into the genome of the host cell. The introduction of such foreign genetic material has allowed the expression of a protein in a species that usually does not produce the protein. It has also allowed the regulation of the expression of a protein (overexpression and underexpression) by introducing modified regulatory sequences making the transcription and translation of the protein more or less efficient. Another use for genetic engineering has been the modification of the biological activity of a structural protein or enzyme by altering the coding region of a gene and thus altering the amino acid sequence of the protein produced. The altered amino acid sequence can lead to changes in conformation, changes in surface charge, and changes in the higher structure of the protein (tertiary and quanternary structure) which all can lead to changes in biological activity.

With the recent growth of the field of "functional genomics" out of the discipline of genomics or gene sequencing, the manipulation of DNA in organisms has taken on another urgent task. In addition to sequencing the genetic material of an organism, functional genomics seeks to identify the function of the genes of a target organism on an industrial scale. By determining the function of most, if not all, genes and the products of those genes in an organism, functional genomics can accelerate the identification of gene and protein targets and allow the identification of compounds that will modulate those genes and gene products to alleviate disease, improve human and animal health, and improve the quality and quantity of food crops. To achieve this, it is necessary to develop rapid, high volume techniques for sytematically altering the expression of essentially every gene in an organism, identifying the corresponding gene and monitoring the effect of the gene alteration on the phenotype of the organism.

Automated processes in molecular genetics have allowed the systematic analysis of genomes from microorganisms, such as yeast and bacteria, by DNA sequencing. Attention is focused on rapidly ascribing functions to newly discovered genes. It is widely recognized in the field of genetics that gene function is most desirably assigned through the analysis of organisms containing defined gene mutations (mutants).

Previous methods of introducing genetic material into a eukaryotic organism are sufficient for mutating a single gene. Such methods include protoplast fusion, transformation by electroporation, particle bombardment, chemical perturbation of cellular envelopes (membranes and walls), phage and viral infection, transduction and physical insertion of DNA into cells. Many of these methods are limited to introducing DNA into a cell in the form of a vector, where the DNA is expressed to produce its gene product. The desired characteristics of a useful gene insertion method for functional genomics include the insertion of a gene or DNA fragment into essentially every gene in the genome of the target organism in an efficient and systematic manner. Methods for getting DNA to integrate into the genome of an organism usually insert the DNA randomly into the genome. Methods for getting DNA to integrate into a specific location in the genome of an organism are less reliable and often have low efficiency.

Random insertion of DNA into another piece of DNA, including genomic DNA, include viral systems that use recombinases such as Cre-lox (Sauer (1996) Nucleic Acid Res. 24:4608–4613) and Flp recombinase (Seibler and Bode (1997) Biochemistry 36:1740–1747). These systems insert DNA at specific sites in DNA in genomic DNA of a host, but the specific sites have been randomly engineered into the genome. Recently, the ability of enzymes known as transposases to transfer DNA fragments from one location in DNA into another random location in DNA have been discovered (Devine et al., U.S. Pat. No. 5,677,170; Devine et al., U.S. Pat. No. 5,728,551; Hackett et al., WO 98/40510; Plasternak et al., WO 97/29202; Reznikoff et al., WO 98/10077; Craig WO 98/37205; Strathman et al., (1991) Proc. Nat. Acad. Sci. USA 88:1247–1250; Phadnis et al., (1989) Proc. Nat. Acad. Sci. USA 86:5908–5912; Way et al., (1984) Gene 32:269–279; Kleckner et al., (1991) Method. Enzymol. 204:139–180; Lee et al., (1987) Proc. Nat. Acad. Sci. USA 84:7876; Brown et al. (1987) Cell 49:347–356; Eichinger et al. (1988) Cell 54:955–966; Eichinger et al. (1990) Genes Dev. 4:324–330). Generally, the transposase recognizes a relatively short DNA sequence known as an inverted repeat that is located on the flanks of an internal piece of DNA. The DNA sequence comprising the internal DNA sequence and the two flanking internal repeat sequences is known as a transposon or transposable element. The transposase has the ability to excise the transposon and insert it in another piece of DNA into which it comes into contact. The location of the insertion is usually not totally random and occurs preferentially at target sequence locations (so called "hot spots")(Kleckner et al., (1991) Method. Enzymol. 204:139–180). Like the viral systems, the insertions are site specific, but the sites are randomly located in the genome and do not allow site directed insertion.

Transposons have been used to introduce a desired gene into an organism, wherein the introduction is via a plasmid or randomly (site specific, but not site directed) into the organism's genome. Another use of transposons is as a sequencing tool since the sequence of the transposon is often known, especially at the borders, such that use of primers designed for the transposon would allow sequencing of the DNA into which the transposon is inserted. The lack of randomness in insertion location would detract from the use of transposons as tools to systematically sequence essentially all genes in an organism or to systematically knock out essentially all genes in an organism. Therefore, their use in functional genomics would appear to be limited.

Using transposons has thus far involved engineering the transposon into a plasmid (e.g., Reznikoff et al., WO 98/10077) and introducing the plasmid into a target organism such that the transposed gene is expressed by the plasmid (Devine et al., U.S. Pat. No. 5,677,170; Devine et al., U.S. Pat. No. 5,728,551). Alternatively, genetic material has been introduced into the genome of an organism by directly transferring the transposon from a plasmid to the genome of a target organism in the presence within the cell of the transferring transposase (Hackett et al., WO 98/40510; Plasternak et al., WO 97/29202). For this to occur, the interior of the cell to be transposed must include a transposable element on a plasmid and the corresponding transposase. Consequently, the only use of transposons to get DNA into the genome of an organism using a transposon has been to directly transpose the transposable DNA in the presence of a transposase into a site specific, but not site directed location (Hackett et al., WO 98/40510; Plasternak et al., WO 97/29202). Additionally, vectors containing a transposon event have been limited to plasmids and the use of the transposed vectors has been the expression of the transposed gene's gene product. Moreover, the introduction of the transposon usually occurs at one of the hotspots, not randomly. The use of transposons to introduce DNA into filamentous fungi, and particularly to introduce DNA either directly or indirectly into the fungal genome has only recently been accomplished (Migheli et al. (1999) Genetics 15:1005–1013).

To accomplish site directed insertion of DNA into the genome of an organism, the method of homologous recombination is necessary, particularly when the objective of insertion is to mutate essentially every gene of the organism. However, there is a general difficulty in transforming filamentous fungal cells by homologous recombination. Such recombination has been notoriously inefficient.

Genome-wide mutagenesis is particularly problematic in filamentous fungi for several reasons. First, active and tractable endogenous transposons have not been described for the vast majority of filamentous fungi. Second, during DNA-transformation, homologous recombination occurs less frequently than nonhomologous (illegitimate or ectopic) recombination. During ectopic recombination, the introduced DNA construct does not recombine with its homologous genome segment but recombines at varied sites throughout the genome. Thus in a resultant group of transformants, strains containing site directed mutations such as gene knockouts (KO's) as a result of homologous recombination must be identified against a large background of strains containing ectopic (nonhomologous) recombination events. Finally, large homologous chromosomal DNA regions (>1000 bp) are needed to direct homologous recombination. Thus several rounds of standard recombinant DNA technology (digestion of DNA with restriction enzymes, isolation of DNA fragments, ligation into plasmid vectors, transformation of E. coli and screening of bacterial colonies) are needed to assemble a single gene KO vector construct. This requirement is detrimental to efficient automation.

Filamentous fungi are a large and diverse group within the kingdom Mycota.

They impact human health as important recyclers of terrestial biomass, as hosts for industrial chemical, vitamin, enzyme and pharmaceutical production, as agents of deterioration and decay and as pathogens of plants and animals. This group of organisms are generally regarded as distinct from distantly-related unicellular fungi such as the yeast *Saccharomyces cerevisiae*. This distinction is obvious in terms of growth morphology (multicellular filamentous hyphae as opposed to unicellular buds) and metabolism (e.g., *S. cerevisiae* is a faculatively anaerobic whereas filamentous fungi are strictly aerobic). The systematic analysis and assignment of function to all the genes of filamentous fungi would provide much new and valuable information about these important organisms.

The present invention provides techniques and materials to allow the systematic mutation, identification and sequencing of essentially all genes in an organism, especially filamentous fungi, by facilitating the homologous recombination of all the genes of the organism. Homologous recombination is facilitated by large insert vector libraries (e.g., cosmid or BAC) in the cell that contain multiple genes, one of which has been mutated. The mutation of the gene in the cosmid occurs using transposons. Such a method allows rapid, large scale production of genomic mutants. The use of a large insert vector construct such as a cosmid allows large flanking DNA sequences that are homologous on each side of the inserted transposon. The flanking DNA sequences can be sequenced using primers based on the inserted transposon and the large flanking DNA sequences facilitate homologous recombination, especially in species where homologous recombination efficiency has previously been low. The use of transposons to insert DNA into cosmids has not been accomplished before and is not recommended by manufacturers of commercially available transposon systems. Therefore, the present invention uses new methods and materials to solve the problem of homologous recombination of difficult species and the rapid, large scale production of genomic mutants as well as the routine sequencing of the gene being mutated. The present invention allows the industrialization of both the identification of essentially all genes in an organism as well as the assignment of function to each of those genes by analysis of the corresponding genomic mutation.

SUMMARY OF THE INVENTION

The present invention relates to a method for facilitating site directed homologous recombination in an organism to produce mutants comprising:

1) providing a large insert vector library comprising one or more large insert vectors, each of said large insert vectors comprising a piece of DNA, said DNA piece comprising multiple genes from a target organism and a first selectable marker functional for selection in bacteria;

2) providing a second vector comprising a transposable element, said transposable element comprising a nucleotide sequence coding for a second selectable marker flanked on each side by an inverted repeat sequence, wherein said selectable marker is bifunctional for selection in bacteria and the target organism and wherein said inverted repeat sequences are functional as a binding site for a transposase;

3) incubating said library with said second vector in the presence of a transposase specific for the inverted repeat sequences on the plasmid vector, such that the transposable element is transferred randomly into an individual large insert of the large insert library to produce disrupted large insert vectors;

4) optionally, amplifying the disrupted large insert vectors resulting from step 3);

5) introducing at least one of said disrupted large insert vectors into a target host cell; and 6) selecting for successful homologous recombination in said target host cell using the second selectable marker.

In a preferred embodiment of the invention, the large insert vector library is a cosmid library or a BAC library, more preferably a cosmid library.

In a preferred embodiment of the invention, said transposable element and transposase are systems of Himar1, AT-2, GPS-1, GPS-2, EZ::tn, SIF and Mu.

The most preferred embodiment of the invention relates to homologous recombination in filamentous fungi, particularly *Magnaporthe grisea*.

Other embodiments of the invention include kits for performing the method according to the present invention. Also included is the libraries thus produced.

DETAILED DESCRIPTION OF INVENTION

Figure 1:
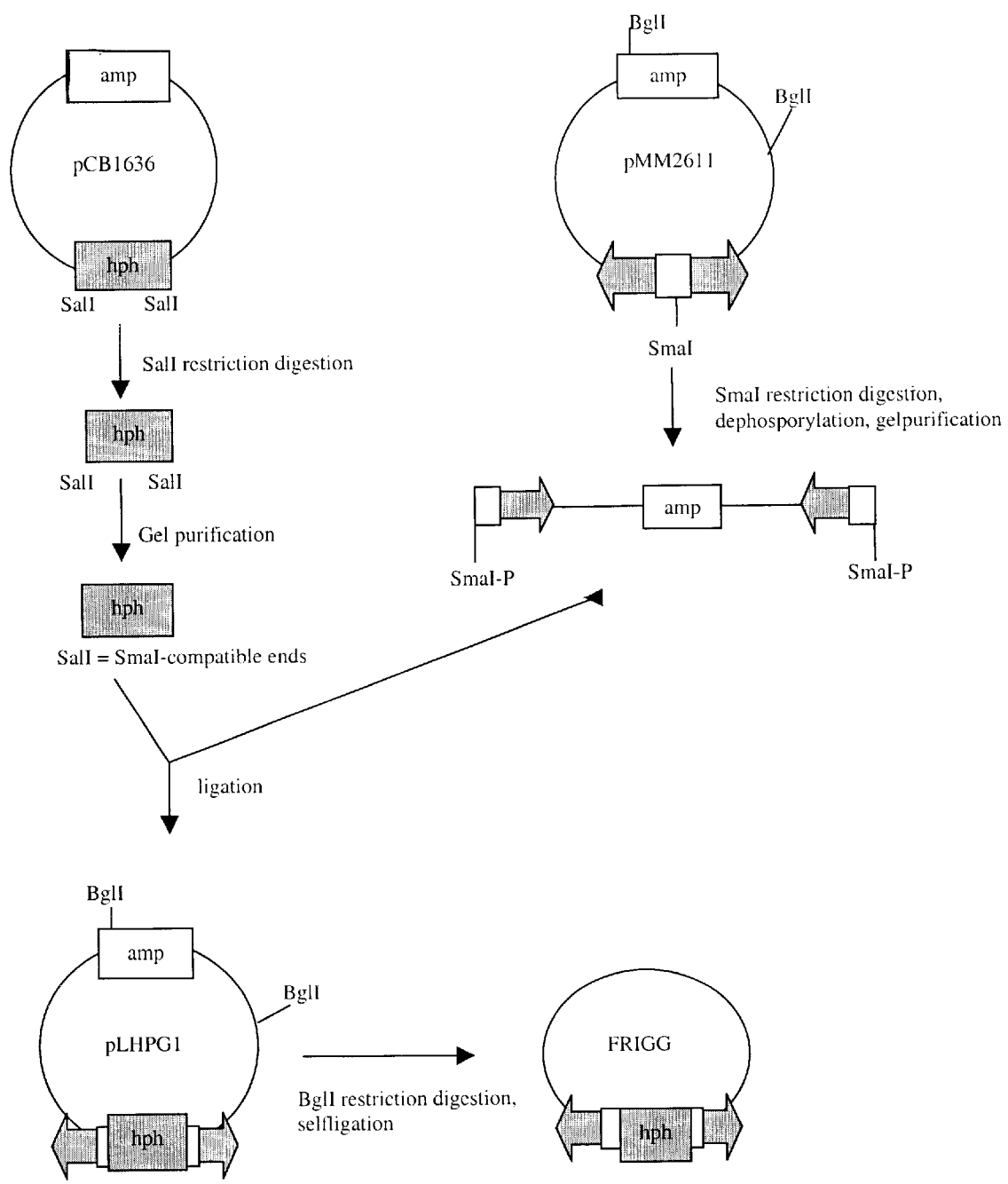
FIG. 1 shows the construction of a transposable element FRIGG as described in Example 1.

The present invention relates to a method for facilitating site directed homologous recombination in an organism to produce mutants comprising:

1) providing a large insert vector library comprising one or more large insert vectors, each of said large insert vectors comprising a piece of DNA, said DNA piece comprising multiple genes from a target organism and a first selectable marker functional for selection in bacteria;

2) providing a second vector comprising a transposable element, said transposable element comprising a nucleotide sequence coding for a second selectable marker flanked on each side by an inverted repeat sequence, wherein said selectable marker is bifunctional for selection in bacteria and the target organism and wherein said inverted repeat sequences are functional as a binding site for a transposase;

3) incubating said library with said second vector in the presence of a transposase specific for the inverted repeat sequences on the plasmid vector, such that the transposable element is transferred randomly into an individual large insert of the large insert library to produce disrupted large insert vectors;

4) optionally, amplifying the disrupted large insert vectors resulting from step 3);

5) introducing at least one of said disrupted large insert vectors into a target host cell; and 6) selecting for successful homologous recombination in said target host cell using the second selectable marker.

Therefore, the present invention is a method for facilitating site-directed homologous recombination in an organism to produce mutations at the directed site. Homologous recombination occurs when two pieces of DNA having similar sequences exchange a portion or fragment of their length of similar DNA sequence through a cross-over event. In particular, the two portions or fragments of DNA involved in the homologous recombination preferably have similar or nearly identical DNA sequences at the ends or distal regions of the portion or fragment of DNA that is exchanged. Mutations are any change that alters the sequence of the nucleotide bases in the genetic material (DNA) of an organism or cell, with alteration occurring either by displacement, addition, deletion, or other destruction. The alteration to the DNA sequence would alter its meaning, that is, its ability to produce the normal amount or normal kind of protein, so the organism or cell itself is altered. Such an altered organism or cell is called a mutant. The most desirable mutations for purposes of the present invention are mutations that cause a decrease or increase in the biological activity of the gene product of the gene comprising the altered DNA. A particularly preferred mutant is a knock-out mutant that essentially destroys biological activity of the gene product through a null mutation or loss of transcription of the gene. Such a mutation can occur by inserting into the DNA of the gene of interest another piece of DNA, such that the inserted DNA disrupts the transcription of the normal gene or produces an incomplete transcript, resulting in a biologically inactive gene product or no gene product at all.

Construction of Large Insert Vectors and Vector Libraries

The large insert vectors used in the methods of the invention contain a piece of DNA, the DNA comprising multiple genes from an organism and a first selectable marker functional for selection in an amplification host, preferably bacteria. Such a large insert vector can be any large vector (i.e., double stranded DNA capable of replication), including cosmids, λ vectors, artificial chromosomes, preferably bacterial artificial chromosomes (BACs), large plasmids, preferably large plasmids containing 5–10 kbp of inserted DNA fragment. The construction of cosmid or BAC libraries is preferred. Markers that are functional for selection in bacteria and the source of such markers are known in the art and include Ampicillin (Amp), Tetracyclin (Tet), Chloramphenicol, Kanamycin (Kan), etc. Construction of a large insert vector begins with a vector, an autonomously replicating DNA unit into which DNA fragments are inserted. A vector contains operational genes including origins of replication, binding sites, restriction sites, etc. Preferably, the origin of replication is compatible with, and functional in, a cell such as *E. coli* for amplification, but is not compatible with or functional in the host organism which is the target of the homologous recombination. To the large insert framework is added an appropriate first selectable marker and a large fragment of DNA from an organism to be targeted for homologous recombination. A large fragment contains at least one entire gene from the target organism, more preferably multiple genes. As a gene typically has a length of about 3 kbp, the large fragment is preferably at least 5–10 kbp, more preferably more than 10 kbp in length. The longer the fragment of DNA inserted into the vector, the more likely that a mutated gene will have long lengths of flanking DNA to facilitate the homologous recombination.

In a preferred embodiment, the vector also contains a negative selection marker. The negative selection marker could then be used to select against ectopic insertions of the entire vector into the genome of an organism, as opposed to the desired insertion of transposon tagged genomic DNA into the genome of the organism via homologous recombination. Preferably, the negative selection marker is functional or is expressed in the target organism of interest, but not in the organism in which the vector is routinely propagated. For example, such functionality could be achieved by operably linking the negative selection marker to a promoter that is active in the target organism, but not in the organism in which the vector is propagated. Alternatively, the negative selection marker could be operably linked to an inducible promoter. In still another embodiment, the negative selection marker could be a gene whose product is lethal for the target organism, but not for the propagation organism.

Suitable negative selection markers include, but are not limited to, cytosine deaminase (Plant Mol Biol (1999) 39:83–93), the cytochrome P450 from *Streptomyces griseo-*

*lus* that catalyzes the dealkylation of R7402 into its cytotoxic metabolite (Plant J (1999) 19:719–726), ochre suppressor tRNA$^{Glu}$II (Gene (1997) 202:171–176), barnase (FEBS Lett (1999) 452:351–354), phosphonate monoesterase (Plant J (1996) 10:383–392), levansucrase (J Bacteriol (1985) 164:918–921), Diptheria toxin A chain (Plant Physiol (1991) 95:687–692) and thymidine kinase from Herpes Simplex Virus (Plant Physiol (1994) 104:1067–1071).

The construction of many large insert vectors from a single organism will result in a gene library containing all the DNA of a given organism inserted as randomized inserted fragments into many thousands of different vectors. The most useful libraries are those containing genome insertions of the sizes needed to encompass complete genes, preferably multiple genes. The construction of a gene library may depend on the use of restriction enzymes like EcoRI that do not make too frequent cuts within DNA. Even then it may be preferable to use incompletely digested DNA when the desired genes are suspected of being extremely long. Additionally, large genomic insertions may be obtained by mechanically or physically shearing DNA of the target organism. Genomic fragments of at least 5 kilobases (kb) are very stably reproduced when inserted into plasmids. Larger fragments can be stably grown within specially tailored phage λ systems that require DNA inserts of 22 kb in order to be packaged within mature particles. Even larger fragments can be stably inserted into cosmid vectors that can hold some 40 to 50 kb of foreign DNA. Thus, using cosmids, for example, it would be possible to obtain multiple coverage of an entire organism genome within a manageable number of large insert vectors. For example, in many fungal genomes, 3000 large insert vectors would provide about a three-fold coverage of the entire genome of the organism.

In another embodiment of the present invention, a large insert vector can include isolated large DNA fragments without vector operational genes. Such DNA fragments can be obtained by restriction digestion of genomic DNA, physical shearing of genomic DNA, PCR amplification of genomic DNA sections or any of the methods used to obtain a large fragment of DNA from an organism to be targeted for homologous recombination as described above. A large fragment contains at least one entire gene from the target organism, more preferably multiple genes. As a gene typically has a length of about 3 kb, the large fragment is preferably at least 5–10 kb, more preferably more than 10 kb in length. The longer the fragment of DNA inserted into the vector, the more likely that a mutated gene will have long lengths of flanking DNA to facilitate the homologous recombination. A collection of many large DNA fragments from an organism results in a large DNA fragment library. Such a large DNA fragment library makes it possible to obtain multiple coverage of an entire organism genome within a manageable number of large DNA fragments.

Construction of Transposable Element

The second vector used in the methods of the invention comprises a transposable element, said transposable element comprising a nucleotide sequence coding for a second selectable marker flanked on each side by an inverted repeat sequence, wherein said selectable marker is bifunctional for selection in bacteria and fungi and wherein said inverted repeat sequences are functional as a binding site for a transposase. The vector to be constructed need not be large and is therefore preferably a plasmid or of about plasmid size. This vector need not contain all the operational genes of a self replicating vector and can be produced by other amplification techniques using primers and polymerases. The vector will contain a bifunctional selectable marker flanked on each side by inverted repeat sequences that bind a transposase.

Transposons occur naturally as DNA sequences coding for an enzyme, transposase, that recognizes and cuts the DNA at sites flanking the gene for the transposase. Integrase is another form of transposase. The recognition sites, or binding sites for the transposase, are referred to as inverted repeat sequence. As such, transposable elements, when activated, produce an enzyme which promotes the excision of itself from one location in DNA and the insertion of the excised DNA at another site. As described in the prior art, the insertion location can be site specific at "hot spots." In the present invention, a bifunctional marker is inserted between the inverted repeat sequences, usually inactivating the production of viable transposase by the disrupted gene.

Usually, a transposable element can be obtained from a suitable source using restriction enzymes and a suitable bifunctional selectable marker can be inserted into the transposable element so long as the insertion does not disrupt the inverted repeat sequences that are the binding site for the appropriate transposon. Several such transposable elements are known in the art, including Himar1 (Lampe et al., (1998) Genetics 149:179–187), AT-2 (tyl based transposon, Perkin Elmer; Devine et al. (1997) Genome Res. 7:551–563), GPS-1 (New England Biolabs), GPS-2 (New England Biolabs), EZ::tn (Tn5 based transposon, Epicenter Technologies), SIF (Tn7 based transposon, Biery et al. (2000) Nucl Acid Res 28:1067–1077), and Mu (Finnzymes, Haapa et al. (1999) Nucl Acid Res 13:2777–2784).

Suitable bifunctional selectable markers are selectable markers that are functional in both the amplification organism and the target organism for homologous recombination. In a preferred embodiment of the present invention, the amplification organism is a bacteria and the target organism for homologous recombination is filamentous fungi, such that a bifunctional selectable marker would allow selection in bacteria and filamentous fungi. Preferred selectable markers for the present invention include hygromycin, argB, pyr-4. Alternatively, a bifunctional selectable marker can include two individual selectable markers, one of which would allow selection in the amplification organism and the other would allow selection in the target organism for homologous recombination.

Transferring Transposable Element Randomly Into Large Insert Vector

After construction of the large insert vector library and construction of a transposable element as described above, they can be mixed or incubated with a suitable transposase such that the transposable element can be moved or transposed into the DNA of the large insert vector library in vitro. The conditions for accomplishing operation of the transposase to cause transposition of the transposable element into the large fragment of the large insert vector of the large insert vector library include use of a suitable transposase. A suitable transposase is a transposase that is specific for binding and excision of the DNA of the inverted repeat sequence being used in the transposable element. This is usually the transposase that is coded for by DNA that normally occurs within the borders of the inverted repeat sequence in its normal, unmutated condition. Particularly suitable transposases useful for the present invention as well as their corresponding transposable elements are the Himar1 mariner transposon (Lampe et al. (1998) Genetics 149:179–187; Lampe et al. (1996) EMBO J. 15:5470–5479), AT-2 (Perkin Elmer Corporation) and GPS-1 and GPS-2 (New England Biolabs). The suitable transposase is incubated with the large insert vector library and the transposable element for sufficient time and at sufficient temperature to allow transposition to take place. A suitable temperature is one that allows the enzymes to operate and not unfold or significantly change conformation, preferably from about 15° C. to about 45° C., more preferably from about 20° C. to about 30° C., most preferably about room temperature. The length of incubation will depend on the amount of coverage anticipated in the large insert vector library and the ratio of donor vector to target vector, the donor vector being the tranposable element and the target vector being the large insert vector. With a preferred ratio of about 1:1 donor:target, a suitable length of time for incubation will be less than about 12 hours, preferably about one hour.

In this way, each large insert vector of the large insert vector library will have the transposable element inserted somewhere in its large fragment DNA. This will result in a large insert vector that has been disrupted at one or more locations of the large fragment. As previously described, a large insert vector can also include just a large fragment DNA and a collection of large fragment DNA's can produce a large fragment DNA library. If the insertion occurs within a gene of the large fragment, a mutation will occur, preferably a knock-out mutation. If the large insert vector library is large enough, it is likely that the resulting library after exposure to transposase and transposable elements will contain mutation of essentially every gene of the target organism.

Amplification of Disrupted Large Insert Vector

The disrupted large insert vectors or disrupted large DNA fragments produced by the present invention can optionally then be amplified. Amplification for large insert vectors other than large DNA fragments can be by growth in a suitable host after transforming the disrupted large insert vectors into a suitable host. Such a suitable host can be any cell or organism capable of transformation, but the preferred amplification host is a bacteria, more preferably *E. coli*. Preferably the host will be selected that is compatible with the replication and operational genes of the disrupted large insert vector. The host will also be one that will allow selection of transformants with the first selectable marker of the large insert vector. Methods of transformation are well known to those of skill in the art as well as techniques for selecting for transformed hosts and harvesting the amplified vectors. Other methods of amplification can also be used including PCR, especially when the large insert vector is a large DNA fragment.

Assessment of Randomness

The randomness (or completeness) of insertion of the transposable element into the large insert vectors of the large insert library can be assessed by preparing cosmid DNA and performing DNA sequencing directed from primers at either ends of the transposon. If insertions are well distributed, near complete sequencing of several hundred thousand insertions should cover the majority of the genome and many genes should have multiple tranposon insertions (alleles). In practice, transposon insertion randomness is assessed on one or a few cosmids and by restriction digests and sequencing.

Homologous Recombination in Host Organism

Disrupted large insert vectors, including large DNA fragments, can be inserted into a target host cell where homologous recombination is to take place. Methods of transformation of large insert vectors into a target host cell are known in the art. A preferred method of transformation particularly suited to filamentous fungi is electroporation or calcium mediated transformation of fungal protoplasts under suitable conditions. Suitable conditions include those described in, for example, Talbot et al. (1993) Plant Cell 5:1575–1590. The host organism can then be grown, and successfully transformed host cells can be selected using the second selectable marker and growing the host cells on an appropriate media. Verification of homologous recombination can be achieved using various methods known in the art. These include Southern blotting, PCR and restriction enzyme analysis.

The methods of the invention are useful for inserting transposons into the genome of any organism having the requisite level of homologus recombination and that can be transformed. A preferred target host cell is a fungi, such as *Magnaporthe grisea, Magnaporthe graminicola, Botrytis cinerea, Erisiphe graminis, Aspergillus niger, Aspergillus fumigatus* and *Phytophthora infestans*. Most preferably the target organism is the filamentus fungus *Magnaporthe grisea*, the causative organism of rice blast disease. Blast disease poses a serious threat to the tropical rice growing regions of the world, which feed more than one third of the global population (Ou (1980) Plant Disease 64: 439–445). It is predicted that an additional 13 million tons of rice per year will be required to keep up with the rapid growth in rice-consuming populations (Lampe, (1994) Foreward, Rice Blast Disease, Manilla, Philippines, CAB International, ix–x). However over 157 million tons of rice have been lost to rice blast disease from 1975 to 1990, a figure that equals 11 to 30% of global rice production (Baker et al., (1997) Science 276: 726–733).

The pathogen, *M. grisea*, a heterothallic Ascomycete, is also pathogenic to many forage grasses and economically important cereal crops including wheat, barley, and fingermillet. The rice blast fungus invades the above ground parts of the rice plant and in severe epidemics, large ellipsoid lesions can engulf the entire leaf surface. Sporulating lesions can spread the infection to the emerging seed panicle. This infection cycle is easily reproduced under controlled conditions allowing detailed studies of the disease process.

The method of the present invention can also be packaged as a kit containing the necessary components to perform the method of the invention as well as instructions for their use. Such a kit could comprise all or some of a transposable element, a matched transposase to the transposable element and a large insert vector to be used in constructing a large insert vector library. The could also include appropriate selectable markers either separate or incorporated into the large insert vector and the transposable element.

The methods, kits and components of the present invention are useful for producing mutations in a target organism by supplying to the target organism a piece of DNA that is well suited to facilitate the homolgous recombination of the piece of DNA and a similar piece of DNA in the host organism. In this way, mutations can be produced in a target organism in a systematic, high-throughput and site-directed manner to allow phenotypic mapping of many or essentially all the genes of an organism.

Following completion of the disruption of essentially all of the genes of a target organism, two collections are produced. The first is a collection of annotated insertion vectors. These can be placed in a database and searches used to locate vectors which can be used to mutate various genomic regions.

The second are collections of fungal strains that would have insertion events at various genomic locations. Fungal strains can be screened for desired phenotypes (e.g. loss of plant pathogenicity as described in Example 5), but can also be screened for changes in metabolites levels or gene expression. Depending on the fungal strain, phenotype screens can be used to look for losses of animal pathogenicity, changes in secreted metabolites (new low molecular weight metabolites resulting from pathway disruption) and changes in secreted protein levels (due to alterations in secretion pathways).

Sequencing of a large number of disrupted large insert vector events from either an individually selected large insert vector or from a genomic large insert vector library will yield multiple alleles or "hits" in the same gene. This allows it to be determined where in the gene the insertion occurs and what type of mutation is produced, e.g., knock-out mutant, decreased biological activity of gene product, decreased level of expression of gene product. This allows a better prediction of the type of phenotype to be expected from mutation of the gene at a specified location along the gene DNA sequence. Such a situation is desirable for several reasons.

First, obtaining multiple alleles indicates that the knock-out process is approaching saturation. This is analogous to the situation in a mutagenesis project where the recovery of multiple alleles indicates target saturation by a particular mutagen.

The second reason for this desired outcome is that multiple alleles would allow a diverse array of phenotypes to be recovered. For example, insertions near the amino terminal end of a gene would be expected to yield null (loss-of-function) phenotypes. However insertions in the promoter regions, carboxy-terminal region or the 3' untranslated leader region may yield different phenotypes. These phenotypes may include reduced activity of the gene product (as opposed to loss-of-function), or altered (increase, decrease or mis-timed) expression (in the case of promoter mutations). This array of possible phenotypes is a distinct advantage of the TAG-KO technology over the construction of strict "knock-out" or loss-of-function phenotypes. Multiple alleles would allow the more facile characterization of gene whose products play a rate limiting role in various processes.

EXAMPLES

Example 1
Construction of Plasmids with a Transposon Containing a Selectable Marker A. Construction of the FRIGG transposon: A sample transposon designated FRIGG, was constructed. pCB1636 contains a bacterial hygromycin B phosphotransferase (hph) gene (Gritz and Davies, (1983) Gene 25:179–188) under control of the Aspergillus nidulans trpC promoter and terminator (Mullaney et al, (1985) Mol Gen Genet 199:37–45). This plasmid was obtained from the Fungal Genetics Stock Center (Kansas City, Mo.). The following manipulations were done according to Sambrook et al. (1989) Molecular Cloning, a Laboratory Manual, Cold Spring Harbor Laboratory Press. A SalI fragment containing the trpC/hph gene from pCB1636 was end-repaired and ligated into the SmaI cut, dephosphorylated transposon vector backbone pMM2611, (a derivative of pMM26 (Lampe et al., (1998) Genetics 149:179–187) to yield the plasmid pLHPG1. Competent E. coli XL1-BLUE cells (Stratagene) were transformed with pLHPG1 according to manufacturer's recommendation. Transformants were selected on LB agar (Sambrook et. al. (1989) Molecular Cloning, A Laboratory Manual, Cold Spring Harbor Laboratory Press.) containing 100 μg/ml ampicillin (Sigma Chem. Co.) and 35 μg/ml hygromycin B (Sigma Chem. Co.). DNA from individual transformants was prepared using a Wizard miniprep kit (Promega Co.) according to manufacturers suggestions. Restriction digestion of pLHPG1 with BglI followed by self ligation caused the extinction of the ampicillin resistance gene, and yielded FRIGG, a transposon containing the Himar1 transposon and a hygromycin resistance gene. Transformation of E. coli cells was performed as described, and FRIGG-containing colonies selected for on LB agar containing 35 μg/ml hygromycin. FIG. 1 depicts the construction of FRIGG.

B. Construction of other transposons: The method of Example 1A is followed except that in place of the pMM2611, the AT-2 (Perkin Elmer; Devine et al. (1997) Genome Res. 7:551–563), GPS-1 (New England Biolabs; www.neb.com) or GPS-2 (New England Biolabs:www.neb.com) transposable elements were utilized.

Example 2
Construction of a Cosmid/BAC Library Containing Fungal Genes and a Selectable Marker Construction of cosmid and BAC libraries was performed as described in Sambrook et al. (1989) Molecular Cloning, a Laboratory Manual, Cold Spring Harbor Laboratory Press. An Amp resistant cosmid, cos1f8 containing the adenylate cyclase (MAC1; Adachi and Hamer, (1998) The Plant Cell 10: 1361–1373) gene of Magnaporthe grisea was chosen to demonstrate the present invention. Alternatively, an insert in a bacterial artificial chromosome BAC 21D3 (Diaz-Perez et al. (1996) Fung. Genet. Biol. 20:280–288) was used as the large insert framework and chloramphenicol was used as the first selectable marker.

Example 3
Construction of Cosmids with Transposon Inserted into Fungal Genes

A. Transposition into a Cosmid: Transposition on the cosmid framework was carried out as described by Lampe et al (1996) EMBO J. 15:5470–5479. In a total volume of 20 μl of transposition buffer (10% glycerol, 25 mM HEPES (pH7.9 at room temperature (RT)), 250 μg of acetylated BSA, 2 mM DTT, 100 mM NaCl, 10 mM $MgCl_2$ or $MnCl_2$) the following components were combined: 1:1 molar amounts of donor:target (100 ng FRIGG: 1 μg pCosmac1), 0.2 μM Himar1 transposase (Lampe et al (1996) EMBO J. 15:5470–5479). The transposition mix was incubated 30 minutes at RT. The transposition reaction was stopped by addition of 80 μl of Stop solution (50 mM Tris-HCl, pH7.6, 0.5 mg/ml proteinase K, 10 mM EDTA, 250 μg/ml yeast tRNA to the tranposition reaction. The mixture was incubated one hour at 30° C. The DNA was precipitated by 50% v/v $NH_4OAc$, 200% v/v Ethanol 95% and resuspended on 10 μl TE buffer (Sambrook et al. (1989) Molecular Cloning, a Laboratory Manual, Cold Spring Harbor Laboratory Press.).

Cosmids containing transposon inserts were amplified as follows. 1 μl of the DNA solution was transformed into E. coli TOP10F' cells (InVitrogen) by electroporation according to manufacturer's recommendations. Cells were plated on L-medium containing 50 μg/ml ampicillin and 25 μg/ml hygromycin and incubated 2 days at 37° C. To verify DNA recovery after transposition and precipitation, an aliquot of the cells was plated on L-medium containing 100 μg/ml ampicillin and incubated at 37° C. overnight.

B. Transposition into a BAC: Transposition on the BAC framework was carried out essentially as described by Lampe et al (1996) EMBO J. 15:5470–5479 except a BAC was used instead of a cosmid. In a total volume of 20 μl of transposition buffer (10% glycerol, 25 mM HEPES (pH7.9 at room temperature (RT)), 250 μg of acetylated BSA, 2 mM DTT, 100 mM NaCl, 10 mM $MgCl_2$ or $MnCl_2$) the following components were combined: 1:1 molar amounts of donor:target (100 ng from Example 1 of GPS-1, GPS-2 or AT-2:1 μg BAC from Example 2) and 0.2 μM GPS-1, GPS-2 or AT-2 transposase, respectively (Perkin Elmer, New England Biolabs; www.neb.com). The transposition mix was incubated 30 minutes at RT. The transposition reaction was stopped by addition of 80 μl of Stop solution (50 mM Tris-HCl, pH7.6, 0.5 mg/ml proteinase K, 10 mM EDTA, 250 μg/ml yeast tRNA to the tranposition reaction. The mixture was incubated one hour at 30° C. The DNA was precipitated by 50% v/v $NH_4OAc$, 200% v/v Ethanol 95% and resuspended on 10 μl TE buffer (Sambrook et al. (1989) *Molecular Cloning, a Laboratory Manual*, Cold Spring Harbor Laboratory Press.).

BACs containing a transposon insert will amplified as follows. 1 μl of the DNA solution was transformed into *E. coli* TOP10F' cells (InVitrogen) by electroporation according to manufacturer's recommendations. Cells were plated on L-medium containing 12.5 μg/ml chloramphenicol and 50 μg/ml hygromycin and incubated 2 days at 37° C. To verify DNA recovery after transposition and precipitation, an aliquot of the cells was plated on L-medium containing 100 μg/ml chloramphenicol and incubated at 37° C. overnight.

Example 4
High Throughput Preparation and Verification of Insertion of Transposon into Fungal Genes

*E. coli* strains containing cosmid pCosmac1 with transposon insertions were picked to 96 well growth blocks (Beckman Co.) containing 1.5 ml of TB (Terrific Broth, Sambrook et al. (1989) *Molecular Cloning, a Laboratory Manual*, Cold Spring Harbor Laboratory Press) supplemented with 100 ug/ml of ampicillin. Blocks were incubated with shaking at 37 C overnight. *E. coli* cells were pellet by centrifugation and cosmids were isolated by a modified alkaline lysis method (Marra et. al. (1997) Genome Res. 7: 1072–1084). DNA quality was checked by electrophoresis on agarose gels. Cosmids were sequenced using a primer (TCGCTCTTGAAGGGAACTATG; SEQ ID NO.1) and commercial dideoxy sequencing kits (Big Dye Terminators, Perkin Elmer Co.). Sequencing reactions were analyzed on an ABI377 DNA sequencer.

DNA sequences adjacent to the site of the insertion were collected and used to search DNA and protein databases using the BLAST algorithms (Altshul et. al. (1997) Nucleic Acids Res. 25:3389–3402). A single insertion of FRIGG into the *M. grisea* adenylate cyclase gene at position nucleotide 3573 (Adachi and Hamer, (1998) The Plant Cell 10: 1361–1373) was chosen for further analysis. This cosmid was designated cpgfrmacFRIGG01a05.

The same procedure as above was performed on the BAC's except that chloramphenicol was used for selection instead of Amp, and appropriate primers were used. Multiple insertions were also observed in BAC's Example 5
Assembly of Transposon Alleles Sequencing of a large number of disrupted large insert vector events from either an individually selected cosmid or from a genomic cosmid library will yield multiple alleles or "hits" in the same gene. This allows it to be determined where in the gene the insertion occurs and what type of mutation is produced, e.g., knock-out mutant, decreased biological activity of gene product, decreased level of expression of gene product. This allows a better prediction of the type of phenotype to be expected from mutation of the gene at a specified location along the gene DNA sequence.

Example 6
Preparation of Cosmid DNA in Bacteria for Transformation of the Fungus *Magnaporthe grisea*

Cosmid DNA was prepared by Qiagen midi-prep method (Qiagen Co.). Growth, storage and transformation of *M. grisea* strain Guy11 was as previously described (Talbot et. al. (1993) The Plant Cell 5: 1575–1590). Approximately 10 ug of DNA was used in each transformation and contained 1×106 protoplasts. Transformation was performed by the method of Talbot et. al. (1993) The Plant Cell 5: 1575–1590. Hygromycin resistant transformants were picked to oatmeal agar media (Crawford et. al. (1986) Genetics 114: 1111–1129). If argB or pyr-4 selectable markers are used, argB or pyr-4 resistant transformants are picked to oatmeal agar media.

Example 7
Verification of Homologous Integration of Transposon into Fungal Genes In vivo disruption of the adenylate cyclase gene was verified at the molecular level by PCR analysis using primers GGCGTTGTGATCTGCAG; SEQ ID NO. 2 and GGCCAGGAAACTCCCAG; SEQ ID NO. 3 and by the phenotype showing the loss of growth integrity (sporulation) and appressorium formation (Adachi and Hamer, (1998) The Plant Cell 10: 1361–1373).

Using this technology, the entire genome of *M. grisea* has been tagged with transposon knockout mutations.

What is claimed is:

1. A method for facilitating site directed homologous recombination in a filamentous fungus to produce mutants comprising:
   a) providing a large insert vector library comprising one or more large insert vectors, wherein each of said large insert vectors comprises more than 20 kilobase pairs genomic DNA from a target filamentous fungus and a first selectable marker functional for selection in bacteria;
   b) providing a second vector comprising a transposable element, said transposable element comprising a nucleotide sequence coding for a second selectable marker flanked on each side by an inverted repeat sequence, wherein said second selectable marker is bifunctional for selection in bacteria and the target filamentous fungus and wherein said inverted repeat sequences are functional as a binding site for a transposase;
   c) incubating one or more of said large insert vectors with said second vector, in the presence of a transposase specific for the inverted terminal repeat sequences on said second vector, such that the transposable element transposes into said genomic DNA to produce a disrupted large insert vector;
   d) optionally, amplifying the disrupted large insert vectors resulting from step (c) in a bacterial cell and selecting for the presence of said first and second selectable markers in said bacterial cell;
   e) introducing at least one of said disrupted large insert vectors into a target host cell from said target filamentous fungus so that homologous recombination occurs between said genomic DNA in said disrupted large insert vector and the genome of said target filamentous fungus and thereby produce a mutated target cell; and
   f) selecting for the presence of said second selectable marker and screening for successful homologous recombination produced by step (e) in said mutated target cell.

2. The method of claim 1, wherein said fungus is *Magnaporthe grisea*.

3. The method of claim 1, wherein said fungus is *Magnaporthe graminicola*.

4. The method of claim 1, wherein said fungus is *Botrytis cinerea*.

5. The method of claim 1, wherein said fungus is *Erysiphe graminis*.

6. The method of claim 1, wherein said fungus is *Aspergillus niger*.

7. The method of claim 1, wherein said fungus is *Aspergillus fumigatus*.

8. The method of claim 1, wherein said fungus is *Phytophthora infestans*.

9. The method according to claim 1 wherein said transposable element and inverted repeat sequence is selected from the group of transposons consisting of: Himar1, GPS-1, GPS-2, EZ::tn, AT-2, SIF and Mu.

10. The method according to claim 1 wherein said large insert vector library is a BAC library.

11. The method according tn claim 1 wherein said large insert vector library is a cosmid library.

* * * * *